United States Patent [19]

Sato et al.

[11] Patent Number: 5,013,607
[45] Date of Patent: May 7, 1991

[54] TRANSPARENT CONDUCTIVE CERAMIC-COATED SUBSTRATE PROCESSES FOR PREPARING SAME AND USES THEREOF

[75] Inventors: Goro Sato, Fukuoka; Michio Komatsu, Tokyo; Toshiharu Hirai, Fukuoka; Yoneji Abe, Fukuoka; Noboru Senjyuu, Fukuoka, all of Japan

[73] Assignee: Catalysts & Chemicals Industries Co., Ltd., Tokyo, Japan

[21] Appl. No.: 391,604
[22] PCT Filed: Aug. 10, 1988
[86] PCT No.: PCT/JP88/00793
§ 371 Date: Jun. 8, 1989
§ 102(e) Date: Jun. 8, 1989
[87] PCT Pub. No.: WO89/03114
PCT Pub. Date: Apr. 6, 1989

[30] Foreign Application Priority Data

Sep. 30, 1987 [JP] Japan .................. 62-246316

[51] Int. Cl.$^5$ .............. B32B 17/06; B05D 5/12
[52] U.S. Cl. .................... 428/426; 428/447; 428/428; 428/429; 428/432; 428/470; 427/123; 427/126.3
[58] Field of Search .............. 427/123, 126.3; 428/447, 410, 428, 426, 429, 432, 450, 469, 689, 446, 470

[56] References Cited

U.S. PATENT DOCUMENTS 4,568,578  2/1986  Arfsten et al. ............. 428/432
4,859,499  8/1989  Sauvinet et al. ........... 427/126.3
4,869,948  9/1989  Iida et al. ................. 428/447

FOREIGN PATENT DOCUMENTS 8606658  5/1985  World Int. Prop. O. ....... 427/126.3

Primary Examiner—Merrell C. Cashion, Jr.
Assistant Examiner—Don Sumihiro
Attorney, Agent, or Firm—Wenderoth, Lind & Ponack

[57] ABSTRACT

Disclosed are transparent conductive ceramiccoated substrates having a surface resistance of $10^3$–$10^{11}$ $\Omega/\square$, a total light transmission of at least 85% and a haze of less than 10%, said coated substrates being prepared by coating on the substrate a water organic solvent mixture type coating liquid containing dialkoxy-bisacetylacetonato zirconium, a partial hydrolysate of silicon alkoxide and a conductive substance, processes for preparing said coated substrates, and display and copy machine using said coated substrates.

14 Claims, 2 Drawing Sheets

TRANSPARENT CONDUCTIVE CERAMIC-COATED SUBSTRATE PROCESSES FOR PREPARING SAME AND USES THEREOF

FIELD OF THE INVENTION

This invention relates to transparent conductive ceramic-coated substrates and processes for preparing the same. In another aspect, the invention relates to uses of the transparent conductive ceramic-coated substrates.

BACKGROUND OF THE INVENTION

Because of their transparency, glass or plastic substrates are used for various purposes. However, these substrates are liable to generate static electricity on their surface, as they are insulators. When the glass or plastic substrates are used, as they are, as face-plates for displays such as cathode ray tube (CRT), fluorescence indication pipe (FIP), plasma display (PDP), liquid crystal display (LCD), etc., rubbish or dust attaches to the surface of face-plate and the images displayed are difficult to look at. Particularly, in the case of LCD, there is sometimes brought about destruction of IC or mismovement.

In a copy machine 1 equipped with an automatic document feeder (ADF) 2 as shown in FIG. 1, paper clogging is sometimes caused by static electricity generated on a platen glass 3 in the course of feeding documents, whereby continuous feeding of the documents can be made no longer.

In the case of plastic substrates, moreover, because of their low surface hardness, the plastic substrates readily receive scratches on their surface, whereby they sometimes decrease in transparency.

With the view of solving such problems as mentioned above, there is proposed a process for forming on the substrates a metallic coating or a conductive inorganic oxide coating by the vapor phase method such as CVD, PVD or vacuum deposition method. The coatings obtained by this process, however, are low in acid resistance and alkali resistance, though they are excellent in transparency and conductivity. Further, these coatings are liable to scratching, because they lack in scratch resistance. Furthermore, vacuum metallizers are needed for forming these coatings and, moreover, there is a limit to an area or shape of the substrate on which the coating can be formed by this apparatus. In the proposed process, the coatings cannot be formed at low temperatures, and a continuous productivity of this process is poor, because the process is carried out batchwise.

In the platen glass having an antistatic effect obtained by the process as mentioned above, the coatings formed on the platen glass was sometimes scraped off by the documents fed by ADF or a rubber belt fitted to ADF. In the platen glass as mentioned above, there was brought about such a new problem that the copying is carried out in higher copy sensitivity, that is, at a gray scale, the portion of the coating scraped off in the manner as mentioned above is printed as a stain on the copy as obtained.

There is also proposed a process for imparting conductivity to substrates by coating conductive paints having dispersed conductive substances in resins on the substrates. The coatings obtained by this process, however, involved such a problem that they are poor in transparency, alkali resistance, salt water resistance, water resistance, solvent resistance and scratch resistance, though they are excellent in conductivity.

The face-plates of displays, in their other aspect, are sometimes desired to have a regular reflection reducing effect (hereinafter called anti-glare), in addition to the antistatic effect, for inhibition of glaring of the plates. In order to impart anti-glare and antistatic effect to the face-plates of displays, the following processes are known. That is, Japanese Patent L-O-P Publn. No. 16452/1986 discloses a process which comprises preheating a face-plate composed of glass or plastics, spraying over said face-plate a colloidal solution of a silicic acid compound such as a partially hydrolyzed silicic ester or the like, a reactive silicon compound such as silicon tetrachloride or the like, or a solution obtained by mixing said colloidal solution with a water-soluble metallic compounds of such metal as platinum, gold, palladium or tin, and forming a finely uneven coating composed of silicon oxide or its hydrate on the surface of the plate, followed by drying and heating.

Further, Japanese Utility Model L-O-P Publn. No. 168951/1984 discloses a process which comprises forming a coating layer on the face-plate by the vacuum deposition or dip coating method from a mixture of tin oxide or indium oxide and silicon oxide or from a laminate thereof.

However, the face-plates of displays obtained by these processes mentioned above are insufficient in antiglare, and the antistatic effect thereof varies depending upon the ambient temperature or humidity. Under certain circumstances, moreover, resolving power of the displays comprising such face-plates decreased sometimes. Further, the coatings formed are poor in adhesion to the face-plates and easily peel off, liable to scratch because of lacking in scratch resistance, and peel off or flow out, because the coatings are low in acid resistance, alkali resistance, salt water resistance, water resistance and solvent resistance, whereby anti-glare and the antistatic effect of the face-plates could not be maintained for a long period of time.

By way of Japanese Patent Application No. 299686/1986, the present applicant applied for a patent on an invention of a coating liquid for forming conductive coating which is obtained by homogeneously dispersing zirconium oxysalt, silicon alkoxide or its derivative and conductive substances in water and an organic solvent, or a coating liquid which is obtained by mixing the above-mentioned coating liquid with a nonsedimentable silica dispersion and a growth inhibitor. The coatings obtained by heating the substrate coated with these coating liquid at a temperature of higher than 250° C. were found to sufficiently have properties necessary for their performance in the face-plate, such as transparency, conductivity, scratch resistance and the like, but when they are heated at a temperature of less than 250° C., the resulting coatings decrease in alkali resistance, solvent resistance, salt water resistance and water resistance, and hence it was difficult to apply said coatings to plastic substrates. Because of their low stability, these coating liquid came to gel when they are continuously coated on substrates, particularly by transfer printing, thereby involving sometimes difficulties in carrying out continuous coating operation of the coating liquid on the substrates. Further, in order to store these coating liquid for a long period of time, it was necessary to maintain the storage temperature thereof at less than 15° C.

The present invention is intended to solve such problems associated with the prior art as mentioned above.

That is, firstly it is an object of the present invention to provide substrates such as those made of glass or plastics provided thereon with transparent conductive ceramic coatings excellent in durability such as alkali resistance, acid resistance, salt water resistance, water resistance and solvent resistance, and also in transparency, scratch resistance, adhesion and antistatic effect, said coatings being formed by using coating liquid for forming transparent conductive ceramic coating in which dialkoxy-bisacetylacetonato zirconium, partial hydrolysate of silicon alkoxide and conductive substances are homogeneously dissolved or dispersed in mixed solvents of water and organic solvents (the substrates are hereinafter called the coated substrate A for short), and secondly an object of the invention is to provide substrates such as those made of glass or plastics provided thereon with transparent conductive ceramic coatings having also anti-glare in addition to the above-mentioned properties (the substrates are hereinafter called the coated substrate B for short) and processes for preparing such substrates as mentioned above.

Thirdly, an object of the invention is to provide a display in which the coated substrate A has been used as a face-plate.

Fourthly, an object of the invention is to provide a display in which the coated substrate B has been used as a face-plate.

Fifthly, an object of the invention is to provide a copy machine in which the coated substrate A has been used as a platen glass.

DISCLOSURE OF THE INVENTION

An essential feature of the transparent conductive ceramic-coated substrates of the present invention resides in that a transparent conductive ceramic coating is formed on the substrate such as glass or plastics by using a coating liquid for forming transparent conductive ceramic coating in which dialkoxy-bisacetylacetonato zirconium, a partial hydrolysate of silicon alkoxide and a conductive substance are homogeneously dissolved or dispersed in a mixed solvent comprising water and an organic solvent, said coated substrate having a surface resistance of $10^3$–$10^{11} \Omega/\square$, a total light transmission of at least 85% and a haze of less than 10%.

A characteristic feature of the transparent conductive ceramic-coated substrate of the present invention resides in that a transparent conductive ceramic coating is formed on the substrate such as glass or plastics by using coating liquid for forming transparent conductive ceramic coating in which dialkoxy-bisacetylacetonato zirconium, a partial hydrolysate of silicon alkoxide and a conductive substance are homogeneously dissolved or dispersed in a mixed solvent comprising water and an organic solvent, said coated substrate having a surface resistance of $10^3$–$10^{11} \Omega/\square$ and a glossiness of 30–100%.

The display of the present invention has a feature in that said display comprises as a face-plate a transparent conductive ceramic-coated substrate having formed thereon a transparent conductive ceramic coating by using a coating liquid for forming transparent conductive ceramic coating in which dialkoxy-bisacetylacetonato zirconium, a partial hydrolysate of silicon alkoxide and a conductive substance have been homogeneously dissolved or dispersed in a mixed solvent comprising water and an organic solvent, said coated substrate having a surface resistance of $10^3$–$10^{11} \Omega/\square$, a total light transmission of at least 85%, a haze of less than 10% and a resolving power of at least 50 bar/cm.

Furthermore, the display of the present invention has a feature in that said display comprises as a face-plate a transparent conductive ceramic-coated substrate having formed thereon transparent conductive ceramic coating by using a coating liquid for forming transparent conductive ceramic coating in which dialkoxy-bisacetylacetonato zirconium, a partial hydrolysate of silicon alkoxide and a conductive substance have been homogeneously dissolved or dispersed in a mixed solvent comprising water and an organic solvent, said substrate having a surface resistance of $10^3$–$10^{11} \Omega/\square$, a glossiness of 30–100% and a resolving power of at least 50 bar/cm.

The copy machine of the present invention has a feature in that said copy machine comprises as a platen glass a transparent conductive ceramic-coated substrate having formed thereon a transparent conductive ceramic coating by using a coating liquid for forming transparent conductive ceramic coating in which dialkoxy-bisacetylacetonato zirconium, a partial hydrolysate of silicon alkoxide and a conductive substance have been homogeneously dissolved or dispersed in a mixed solvent comprising water and an organic solvent, said coated substrate having a surface resistance of $10^3$–$10^{11} \Omega/\square$, a total light transmission of at least 65%, a haze of less than 10%.

The process for preparing transparent conductive ceramic-coated substrates of the present invention is basically featured by the fact that a coating liquid for forming transparent conductive ceramic coating in which dialkoxy-bisacetylacetonato zirconium, and a partial hydrolysate of silicon alkoxide and a conductive substance have been homogeneously dissolved or dispersed in a mixed solvent comprising water and an organic solvent is coated on a substrate such as glass or plastics, followed by drying and/or heating.

Furthermore, the process of the present invention as mentioned above is featured by the fact that the aforementioned coating liquid is coated on a substrate such as glass or plastics preheated to 40°–90° C. and maintained at that temperature, followed by driving and/or heating.

The process for preparing transparent conductive ceramic-coated substrate of the present invention has a feature in that said process comprises effecting irradiation of an electromagnetic wave having a wavelength shorter than that of visible light after and/or during at least one of the steps (1) of coating the coating liquid on the substrate, (2) of drying the coated coating and (3) of heating the coating as coated.

The process for preparing transparent conductive ceramic-coated substrate of the present invention has a feature in that the coated substrates obtained by the above-mentioned processes for preparing transparent conductive ceramic-coated substrates are coated on the surface with a coating liquid for forming a transparent protective coating, followed by drying and/or heating.

Furthermore, the process of the present invention mentioned above is featured by the fact that said coated substrates preheated to 40°–90° C. and maintained at that temperature are coated with a coating liquid for forming a transparent protective coating, followed by drying and/or heating.

The process for preparing transparent conductive ceramic-coated substrates has a feature in that said process comprises effecting irradiation of an electromagnetic wave having a wavelength shorter than that of visible light after and/or during at least one of the steps (1) of coating a coating liquid for forming a transparent protective coating on said coated substrate, (2) of drying the coated coating and (3) of heating the coating as formed.

BEST MODE FOR PRACTICING THE INVENTION

Figure 1:
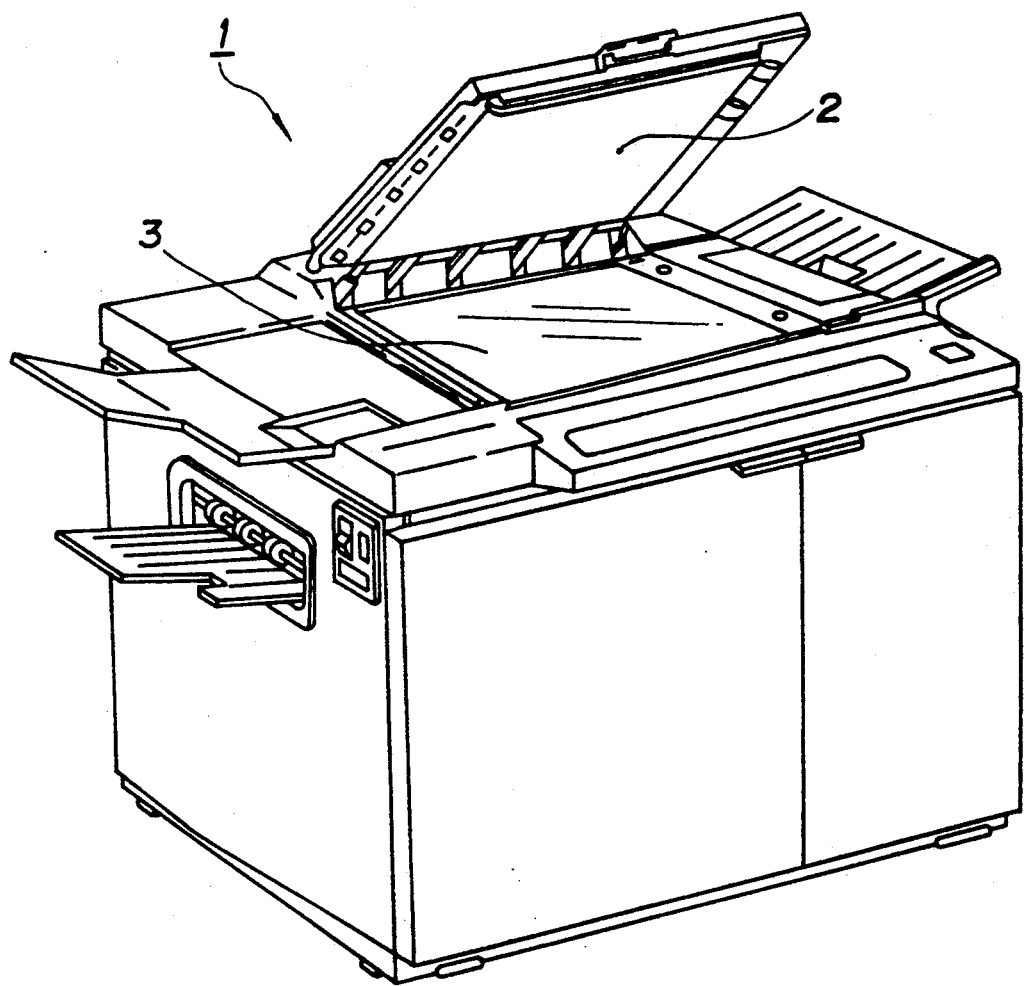
FIG. 1 is an oblique view of a copy machine in which a platen glass for copy machine of the present invention.

First, the coating liquid for forming transparent conductive ceramic coatings of the present invention are illustrated below in detail.

The coating liquid are prepared by homogeneously dissolving or dispersing dialkoxy-bisacetylacetonato-zirconium, a partial hydrolysate of silicon alkoxide and a conductive substance in a mixed solvent comprising water and a organic solvent. The components of the coating liquid mentioned above are illustrated hereinafter.

By dialkoxy-bisacetylacetonato zirconium is meant those having an alkoxy group of 1 to 8 carbon atoms, and a butoxy group is particularly preferred as the alkoxy group. In the coating liquid, dialkoxy-bisacetylacetonato zirconium plays a role to improve dispersibility and heat stability of the conductive substance present in the coating liquid and this is considered ascribable to the fact that dialkoxy-bisacetylacetonato zirconium acts as a protective colloid to the conductive substance in the coating liquid.

Useful silicon alkoxide includes compounds having 1-4 alkoxy groups of 1-8 carbon atoms or their condensates (up to pentamers) represented by the formula $SiH_a(OR)_b$ (in which $a=0-3$, $b=1-4$, $a+b=4$, R is an alkyl group), or the formula $(R'O)_aSi(OR)_b$ or $R'_aSi(OR)_b$ (in which $a=1-3$, $b=1-3$, $a+b=4$, R and R' are individually the same or different alkyl group), or derivatives obtained by substituting parts of hydrogen atoms of the compounds of the above formula with Cl or vinyl group. Of these compounds mentioned above, particularly preferred are compounds represented by the formula $Si(OR)_4$ in which R is methyl, ethyl, propyl or butyl. The compounds represented by the above-mentioned formulas may be used either singly or in admixture of two or more. The conditions under which partial hydrolysis of silicon alkoxide is carried out may be those commonly adopted for partially hydrolyzing silicon alkoxide. For instance, there may be employed such conditions under which silicon alkoxide is partially hydrolyzed by mixing it with methanol or ethanol, followed by the addition thereto of water and acid, but particularly preferred conditions are those mentioned below. As the acid, there is used hydrochloric acid, nitric acid, phosphoric acid or acetic acid, and the mixing ratio of the acid to silicon alkoxide is preferably $0.01 \leq acid/SiO_2 \leq 0.5$ (weight ratio when silicon alkoxide is calculated in terms of $SiO_2$). If a value of $acid/SiO_2$ is less than 0.01, unaltered silicon alkoxide is present in large amounts in the resulting coating, thereby hindering conductivity of the coating obtained. On the other hand, if this value exceeds 0.5, a rate of partial hydrolysis becomes excessively high, whereby continuous productivity, and preservability of the coating liquid decrease. The mixing ratio of water to silicon alkoxide is preferably water/silicon alkoxide$\geq 2$ (molar ratio). If this value is less than 2, because of the presence of unaltered silicon alkoxide in the resulting coating, adhesion between the coating and substrate, and scratch resistance and durability of the coating decrease. The partial hydrolysis temperature employed is desirably from 30° to 80° C.

The conductive substance used in the present invention includes widely those hitherto known as conductive substances such as tin oxide, tin oxide doped with one or two or more antimony, fluorine and phosphorus, indium oxide or indium oxide doped with tin or fluorine.

These conductive substances used are preferably in the form of fine particle having an average particle diameter of less 0.4 μm. It is preferable to use conductive substances having an average particle diameter of 0.01–0.1 μm when they are used in the coatings for face-plates for displays such as CRT, PIP, PDP and LCD or a platen glass for copy machine, for which high transparency and a low haze is required. However, even when the conductive substance used are particles having an average particle diameter of less than 0.1 μm, if said substance contains a larger proportion of particles having a particle diameter of exceeding 0.1 μm, the transparent conductive ceramic coating obtained comes to decrease in transparency, and hence more than 60% of the total particles of the conductive substance used is preferably occupied by particles having a particle diameter of less than 0.1 μm.

Such conductive substances as illustrated above are fully described in Japanese Patent L-O-P Publn. No. 11519/1988 "PROCESS FOR PREPARING CONDUCTIVE POWDER" and Japanese Patent L-O-P Publn. No. 230617/1987 "TIN OXIDE SOL AND PROCESS FOR PREPARING SAME", both filed previously by the present applicant.

The organic solvent used in the aformentioned mixed solvent for forming the coating liquid of the present invention includes alcohols such as methanol, ethanol, propanol, butanol, diacetone alcohol, furfuryl alcohol, ethylene glycol and hexylene glycol; esters such as methyl acetate and ethyl acetate; ethers such as diethyl ether and ethylene glycol monomethyl ether; and ketones such as acetone and methyl ethyl ketone. These organic solvents may be used either singly or in combination.

In the coating liquid formed from the above-mentioned components, the mixing ratio of dialkoxy-bisacetylacetonato zirconium to the conductive substance ($ZrO_2/MO_x$) is preferably in the range of $0.01 \leq ZrO_2/MO_x \leq 1$ (weight ratio when dialkoxy-bisacetylacetonato zirconium is calculated in terms of oxide as $ZrO_2$, and the conductive substance is calculated in terms of oxide as $MO_x$). If a value of $ZrO_2/MO_x$ is less than 0.01, dispersability and heat stability of the conductive substance decrease and the resulting coating becomes poor in transparency and in adhesion, or preservability of the coating liquid, and continuous productivity of the process become poor. On the other hand, if this value exceeds 1, the resulting coating becomes poor in transparency and in adhesion to the substrate, or decrease in conductivity.

The ratio in the coating liquid of dialkoxy-bisacetylacetonato zirconium to silicon alkoxide is preferably in the range of $0.05 \leq ZrO_2SiO_2 \leq 10$ taken as a weight ratio of the two, both calculated in terms of oxide. If this value is less than 0.05, the resulting coating is not sufficient in durability and, on the other hand, if this value exceeds 10, the resulting coating undesirably decreases in adhesion to the substrate and in transparency.

Further, the ratio in the coating liquid of the conductive substance to dialkoxy-bisacetylacetonato zirconium plus silicon alkoxide is preferably in the range of $0.5 \leq MO_x/(SiO_2 + ZrO_2) \leq 5$ taken as a weight ratio of the two, both calculated in terms of oxide. If this value is less than 0.5, the resulting coating is not sufficient in conductive and, on the other hand, if this value exceeds 5, the resulting coating undesirably decreases in adhesion to the substrate and in scratch resistance.

The solids concentration in the coating liquid for forming transparent conductive ceramic coating of the present invention may be less than 15% by weight calculated as $(MO_x + SiO_2 + ZrO_2)$. If this value exceeds 15% by weight, the coating liquid undesirably becomes poor in preservability and, on the other hand, if said solids concentration is excessively low, the coating operation must be repeated several times to obtain the coating having a desired film thickness and hence the solids concentration for practical use is more than 0.1% by weight.

The concentration of water in the coating liquid for forming transparent conductive ceramic coating is preferably in the range of from 0.1 to 50% by weight. If a value of the water concentration is less than 0.1% by weight, the hydrolysis as desired of dialkoxy-bisacetylacetonato zirconium and silicon alkoxide is not effected sufficiently, leaving unaltered components in the resulting coating, with the result that the coating obtained undesirably decreases in adhesion to the substrate, scratch resistance and durability. On the other hand, if this value exceeds 50, repelling occurs between the coating liquid and the substrate and the coating is difficult to form satisfactorily on the substrate.

A process for preparing the coating liquid or forming transparent conductive ceramic coating of the present invention is illustrated below. This coating liquid may be prepared by adding dialkoxy-bisacetylacetonato zirconium to a mixed solvent comprising water and an organic solvent in which the conductive substance has been dispersed, thereby improving the conductive substance in dispersibility and heat stability, and then adding thereto a partial hydrolysate of silicon alkoxide. Alternatively this coating liquid may also be prepared by previously mixing dialkoxy-bisacetylacetonato zirconium with the partial hydrolysate of silicon alkoxide, and then mixing the resulting mixture with the conductive substance. It is not preferable in this case to add the partial hydrolysate of silicon alkoxide to the conductive substance before the addition to the conductive substance of dialkoxy-bisacetylacetonato zirconium, because the conductive substance undergoes aggregation.

In the coating liquid thus prepared, monodispersion of the conductive substance in said coating liquid is maintained by the action as a protective colloid of dialkoxy-bisacetylacetonato zirconium present therein, and the coating liquid is improved in heat stability without hindering transparency and conductivity of the resulting coating. Therefore, no gelation of the coating liquid occurs at the time when said coating liquid is used in a continuous process for the preparation of the desired coating therefrom, and further the coating liquid can be preserved for an extended period of time even at a temperature of about 40° C.

The substrate used in the present invention may be transparent substrates such as glass or plastics, and these substrates may have any shape such as a flat or curved plate. In the present invention, there may also be used such substrates as having a roughened surface (for example, ground glass). When the coating liquid is coated on a roughened surface of the substrate, said coating liquid penetrates into the roughened surface and form a coating on the substrate, whereby the coated surface becomes flat and consequently the substrate becomes transparent. In this case, adhesion between the coating and the substrate markedly improves.

The process for preparing the coated substrate A is illustrated hereinafter.

The first process for preparing the coated substrate A comprises coating the above-mentioned substrate with the above-mentioned coating liquid by any of coating methods such as dip coating, spinner coating, spray coating, roll coating and flexographic printing to form a flat coating on the substrate, followed by drying and/or heating. The substrate after coating is dried at a temperature of from ordinary temperature to about 110° C. to give the coated substrate A provided with a coating excellent in adhesion to the substrate, scratch resistance and transparency. When the coated substrate after drying is heated at a temperature of higher than 120° C. but low than the glass transition point of the substrate, the coated substrate A provided with a coating improved in durability is obtained. In this case, the heating may be repeated several times if the heating temperature employed is below the glass transition point of the substrate.

The second process for preparing the coated substrate A comprises effecting irradiation of an electromagnetic wave having a wavelength shorter than that of visible light after and/or during at least one of the steps (1) of coating the coating liquid on the substrate, (2) of drying the coated coating and (3) of heating the formed coating. By virtue of the irradiation of the electromagnetic wave, the heating temperature employed can be lowered, for instance, when the irradiation of the electromagnetic wave is effected in this process, there is obtained a coating which will come, even when heated at 300° C., to have properties equal to those of a coating obtained by heating at 400° C. without said irradiation.

The third process for preparing the coated substrate A comprises coating the coated substrate A obtained in the first or second process for preparing the coated substrate A with a coating liquid for forming a transparent protective coating by any of coating methods such as dip coating, spinner coating, spray coating, roll coating and flexographic printing to form a flat coating on said coated substrate A, followed by drying and/or heating. The coating liquid for forming a transparent protective coating used in this case may be those capable of forming transparent protective coatings consisting essentially of $SiO_2$ and/or $ZrO_2$. For instance, there may be mentioned a solution or dispersion containing a partial hydrolysate of silicon or zirconium alkoxide, chelate compound of silicon or zirconium and oxyzirconium salt. Alternatively, there may also be used the coating liquid for forming transparent conductive ceramic coatings of the present invention, from which the conductive substance has been excluded.

The fourth process for preparing the coated substrate A comprises effecting irradiation of an electromagnetic wave having a wavelength shorter than that of visible light after and/or during at least one of the steps (1) of coating the coating liquid for forming a transparent protective coating on the substrate obtained in the first or second process for preparing the coated substrate A, (2) of drying the formed transparent protective coating and (3) of heating the formed transparent protective coating.

The coated substrates A obtained by these processes as mentioned above have such properties as a surface resistance of $10^3$–$10^{11} \Omega/\square$, a total light transmission of at least 85% and a haze of less than 10%. If the surface resistance of the coated substrate A exceeds $10^{11} \Omega/\square$, no sufficient antistatic effect is obtained. If the total light transmission and haze of the coated substrate A have values beyond those as defined above, the coated substrate A becomes poor in transparency.

Figure 2:
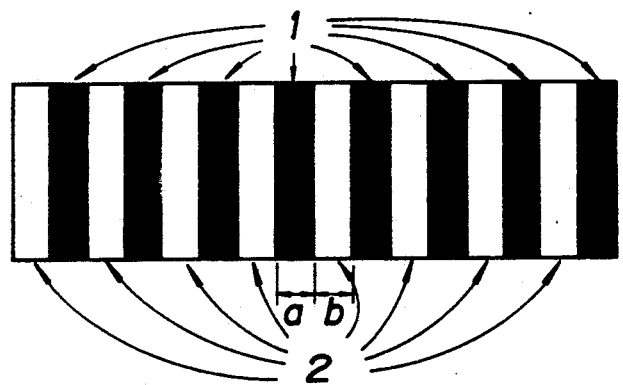
FIG. 2 is a bar chart.
Figure 3:
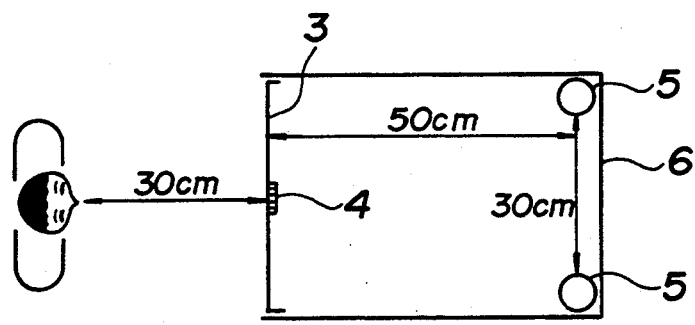
FIG. 3 is to show an apparatus for measuring a resolving power.

In the display of the present invention in which the coated substrate A is used as a face-plate, said coated substrate A preferably has a resolving power of at least 50 bar/cm, in addition to the properties mentioned above. This resolving powder was measured by the following manner. That is, a bar chart 4 as shown in FIG. 2 is attached to the coated substrate A 3 on the side having no coating, and this coated substrate A 3 is arranged in a box 6, 30 cm×50 cm, so that the coated side of the coated substrate A 3 is exposed outside the box in the manner as shown in FIG. 3 so as to ascertain how many bars separated per cm can visually be confirmed at a distance of 30 cm from the coated substrate A 3. The number of bars separated per cm that can visually be confirmed was taken as a resolving power of the coated substrate A. In this case, the inner walls of the box 6 were colored white, and fluorescent lamps 5 of 20 W were provided on both sides of the inner wall of the box 6 opposite to the coated substrate A. The bar chart used included those prepared by increasing the number of bars every 5 bar/cm, for example, those having 10 bar/cm, 15 bar/cm, 20 bar/cm, 25 bar/cm and the like. In the bar chart, 1 is a printed bar portion, 2 is a space between the bars, and a width a of the printed bar portion is equal to a width b of the space.

In the copy machine of the present invention using the coated substrate A as a platen glass, said coated substrate A preferably has a light transmission at a wavelength of 550 nm which does not exceeds ±5% compared with the light transmission of the substrate prior to forming the coating thereon.

Because the coating formed on coated substrate A is composed of ceramic, said coating is difficult to scrape off. However, sometimes a part or parts of the coating are scraped off by the document being fed to ADF or by a rubber belt fitted to ADF. During copying operation at a gray scale, such scraped portions appear as stains on the printed copy when a difference in light transmission (550 nm) between the scraped portions of the coated substrate A and the substrate prior to forming the coating thereon exceed ±5%.

Accordingly, when the coated substrate A is used as a platen glass, it is desirable that the difference in light transmission (550 nm) between the non-scraped or the scraped portions of said coated substrate A and the substrate prior to forming the coating thereon does not exceed ±5%, preferably ±3%. In short, this desideratum is to satisfy the following equations when a light transmission of the non-scraped portions, the scraped portions of said coated substrate A and the substrate prior to forming the coating thereon is taken respectively as $Tt_1(\%)$, $Tt_2(\%)$ and $Tt\theta (\%)$.

$$|Tt_1 - Tt\theta| \leq 5\% \quad (1)$$

$$|Tt_2 - Tt\theta| \leq 5\% \quad (2)$$

The substrates for platen glass used in the present invention, on which the coating is formed, may be a platen glass commonly used in copy machine, and such platen glass preferably has a light transmission (550 nm) of at least 86%.

The process for preparing the coated substrate B is illustrated in detail hereinafter.

The first process for preparing the coated substrate B comprises coating the coating liquid over the substrate preheated and maintained at 40°–90° C., preferably 50°–70° C. to form scale-like segmental coatings on said substrate, followed by drying and/or heating.

If the temperature employed for preheating the substrate is below 40° C., droplets of the coating liquid as sprayed over the substrate undergo leveling before they are sufficiently dried and form a flat coating thereon, whereby no anti-glare can be obtained in the coated substrate. On the other hand, if this temperature exceeds 90° C., the droplets of the coating liquid as sprayed are quickly dried, whereby the coating formed on the substrate markedly decreases in adhesion to said substrate, transparency and durability.

The coating liquid may be coated on a substrate by such methods as spray coating, spin coating, dipping and roll coating.

After coating, the coated substrate is dried at a temperature of ordinary temperature to about 100° C., whereupon the coated substrate B on which a coating excellent in adhesion to the substrate, scratch resistance and transparency has been formed is obtained. When the coated substrate after drying is further heated at a temperature above 120° C. but below the glass transition point of the substrate, the coated substrate B on which a coating improved in durability has been formed is obtained. In this case, the heating may be repeated several times at that temperature but below the glass transition point of the substrate.

The second process for preparing the coated substrate B comprises effecting irradiation of an electromagnetic wave having a wavelength shorter than that of visible light after and/or during at least one of the steps (1) of coating the coating liquid on the substrate to form a coating, (2) of drying the formed coating and (3) of heating the dried coating. By virtue of the irradiation of the electromagnetic wave, the heating temperature can be lowered, for instance, if the irradiation of the electromagnetic wave is effected in the manner as mentioned above, the coating obtained by heating at a temperature of 300° C. will come to have properties equal to those of a coating obtained by heating at a temperature of 400° C.

The third process of preparing the coated substrate B comprises preheating and maintaining at 40°–90° C. a coated substrate obtained in the first or second process for preparing the coated substrate A or a coated substrate obtained in the first or second process for preparing the coated substrate B, coating said coated substrate with a coating liquid for forming a transparent protective coating, and drying said coating liquid on the substrate to form scale-like segmental coatings thereon, followed by drying and/or heating. The coating liquid for forming a transparent protective coating used in this case is the same coating liquid as used in the third process for preparing the coated substrate A.

The fourth process for preparing the coated substrate B comprises effecting irradiation of an electromagnetic wave having a wavelength shorter than that of visible light after and/or during at least one of the steps (1) of coating the coating liquid for forming a transparent protective coating on a coated substrate obtained in the first or second process for preparing the coated substrate A or the coated substrate B, (2) of drying the transparent protective coating formed on said substrate and (3) of heating the dried coating.

The coated substrate B obtained by these processes as mentioned above has such properties as a surface resistance of $10^3$–$10^{11}\Omega/\square$, and a glossiness of 30–100% as measured at a measuring angle of 60° according to the method for measuring glossiness stipulated in JIS K7105-81.

In the display of the present invention using the coated substrate B as a face-plate, this coated substrate B preferably has a resolving power of at least 50 bar/cm, in addition to the aforementioned properties. This resolving power was measured by the same procedure as in the case of the coated substrate A used as a face-plate.

The glossiness of the coated substrate B is represented by a value of glossiness as measured at a measuring angle of 60° according to the method for measuring glossiness stipulated in JIS K7105-81 as mentioned above, and if this value obtained is less than 30%, the coated substrate B decreases in transparency. On the other hand, if this value exceeds 100%, no anti-glare of the coated substrate B is obtained, and hence said value is preferably less than 100%, though no upper limit is particularly limited.

In the coated substrate B, an average surface roughness Rz (a ten-point average roughness as measured in accordance with JIS B0601-82) is desirably 0.2–5.0 µm. If this average roughness is less than 0.2 µm, anti-glare undesireably decrease and no sufficient antistatis effect is obtained, though the coated substrate B is found to be excellent in resolving power and transparency. On the other hand, if this average roughness exceeds 5.0 µm, the coated substrate B undesirably decreases in resolving power and transparency.

EFFECT OF THE INVENTION

The transparent conductive ceramic-coated substrates of the present invention have on the surface of the substrate a transparent conductive ceramic coating composed of zirconia, silica and a conductive substance, and are excellent in scratch resistance, adhesion to the substrate and durability.

Further, the coated substrate A has such properties as a surface resistance of $10^3$–$10^{11}\Omega/\square$, a total light transmission of at least 85% and a haze of less than 10%, and the coated substrate B has such properties as a surface resistance of $10^3$–$10^{11}\Omega/\square$ and a glossiness of 30–100% as measured at a measuring angle of 60° according to the method for measuring glossiness stipulated in JIS K7105-81, and hence the coated substrates A and B are excellent in transparency, antistatic effect and anti-glare.

In the display of the present invention using the coated substrate A as a face-plate, said coated substrate A as the face-plate has a resolving power of at least 50 bar/cm, and also in the display using the coated substrate B as a face-plate, said coated substrate B as the face-plate has a resolving power of at least 50 bar/cm.

In the copy machine of the present invention using the coated substrate A as a platen glass, because said coated substrate A as the platen glass has such property that a light transmission at a wavelength of 550 nm of the coated substrate A does not exceed ±5% compared with the light transmission of the substrate before forming the coating thereon, even when the coating formed is partly or completely scraped by documents being fed to ADF or by a rubber belt fitted to ADF for feeding the documents in the course of copying at a gray scale, no scraped portions of the coating will not appear as stain on the resulting reprints.

Accordingly, the transparent conductive ceramic-coated substrates of the present invention can be used in the field of application for which an antistatic function and anti-glare are required, such as face-plate for displays, for example, CRT, FIP, PDP or LCD, platen glass for copy machine, instrument panel, telewriting terminal, lens, etc.

The present invention is illustrated below in detail with reference to examples, but it should be construed that the invention is in no way limited to those examples.

Preparation of partial hydrolysate of silicon alkoxide

Liquid A

To 100 g of ethyl silicate-28 (ethanol solution of tetraethoxy silane, $SiO_2$ conc. 28 wt %) was added with stirring 110 g of ethanol and was further added 70 g of an aqueous solution containing 2.5% by weight of nitric acid. The resulting mixed liquid was then heated to 60° C. and maintained at that temperature for 1 hour.

Liquid B

To 10 g of the liquid A was added 23 g of ethanol, followed by thorough mixing.

Preparation of coating liquid for forming transparent protective coating

Liquid C

To 100 g of ethyl silicate-28 was added with stirring 824 g of ethanol and were further added 112 g of an aqueous solution of zirconium oxyacetate (25% by weight calculated as $ZrO_2$) and 84 g of water, followed by thorough mixing.

Liquid D

To 50 g of the liquid C was added 33 g of ethanol, followed by thorough mixing.

Liquid E

To 100 g of the liquid A were added with stirring 7.6 g of dibutoxy-bisacetylacetonato zirconium (13% by weight calculated as $ZrO_2$) and 92.3 g of ethanol, followed by thorough mixing.

Liquid F

To the liquid B was added 170 g of ethanol, followed by thorough mixing.

Conductive substance

Liquid G

Conductive Tin Oxide Colloid (ELCOM TL-93, a product of Catalysts & Chemical Industries Co. Ltd., dispersant: water, solids concentration 20% by weight, average particle diameter: 0.07 $\mu$m, and 87% of the total particles was occupied by particles having a particle diameter of less than 0.1 $\mu$m.

Preparation of coating liquid for forming transparent conductive ceramic coating Liquid H To 600 g of the liquid G was added 1377 g of ethanol and thereto was added with stirring 123 g of dibutoxy-bisacetylacetonato zirconium (13% by weight calculated as $ZrO_2$). To the resulting mixture was added 400 g of the liquid A, followed by thorough mixing.

Liquid I

To 375 g of the liquid G and thereto was added with stirring 192 g of dibutoxy-bisacetylacetonato zirconium (13% by weight calculated as $ZrO_2$). To the resulting mixture was added 500 g of the liquid A, followed by thorough mixing.

Liquid J

To the liquid I was added 4125 g of ethanol, followed by thorough mixing.

EXAMPLE 1

A 14-inch cathode ray tube panel was coated on the face-plate with the liquid H by means of a spinner. Thereafter, the panel as coated was dried at 110° C. for 10 minutes and heated at 350° C. for 30 minutes.

EXAMPLE 2

Example 1 was repeated except that after the completion of the drying step, the dried panel was irradiated with light from a high pressure mercury-vapor lamp, 210 mw/cm$^2$ and 2 Kw, for 3 minutes.

EXAMPLE 3

The panel obtained in Example 1 was coated on the face-plate with the liquid C by means of a spinner, followed by drying at 110° C. for 10 minutes and heating at 200° C. for 30 minutes.

EXAMPLE 4

Example 3 was repeated except that after the completion of the drying step, the dried panel was irradiated with light from a high pressure mercury-vapor lamp, 210 mw/cm$^2$ and 2 Kw, for 3 minutes.

EXAMPLE 5

A 14-inch cathode ray tube panel kept at 60° C. was coated on the face-plate with 20 ml of the liquid I by means of a spray coater at an air pressure of 2.0 kg/cm$^2$, followed by drying at 110° C. for 10 minutes and heating at 350° C. for 30 minutes.

EXAMPLE 6

Example 5 was repeated except that the panel was kept at 70° C. and, after the completion of the drying step, the dried panel was irradiated with light from a high pressure mercury-vapor lamp, 210 mw/cm$^2$ and 2 Kw, for 3 minutes.

EXAMPLE 7

The panel obtained in Example 5 was kept at 60° C. and coated on the face-plate with 20 ml of the liquid A by means of a spray coater at an air pressure of 2.0 kg/cm$^2$, followed by drying at 110° C. for 10 minutes and heating at 200° C. for 30 minutes.

EXAMPLE 8

Example 7 was repeated except that after the completion of the drying step, the dried panel was irradiated with light from a high pressure mercury-vapor lamp, 210 mw/cm$^2$ and 2 Kw, for 3 minutes.

EXAMPLE 9

The panel obtained in Example 2 was kept at 70° C. and coated on the face-plate with 20 ml of the liquid E by means of a spray coater at an air pressure of 2.0 kg/cm$^2$, followed by drying at 110° C. for 10 minutes and heating at 200° C. for 30 minutes.

EXAMPLE 10

Example 9 was repeated except that after the completion of the drying step, the dried panel was irradiated with light from a high pressure mercury-vapor lamp, 210 mw/cm$^2$ and 2 Kw, for 3 minutes.

EXAMPLE 11

Example 1 was repeated except that an acrylic plate was used as the substrate and no heating was effected.

EXAMPLE 12

A platen glass, 450 mm $\times$ 300 mm $\times$ 4 mm, was coated on the surface with the liquid H by means of a roll coater, followed by drying at 110° C. for 15 minutes and then heating at 350° C. for 30 minutes.

EXAMPLE 13

A platen glass after drying which was obtained in Example 12 was cooled to room temperature. The platen glass was coated on the cooled coating with the liquid A by means of a roll coater, followed by drying at 110° C. for 15 minutes and then heating at 200° C. for 30 minutes.

EXAMPLE 14

Example 13 was repeated except that the liquid B was used in place of the liquid A.

EXAMPLE 15

Example 13 was repeated except that the liquid E was used in place of the liquid A.

EXAMPLE 16

The platen glass obtained in Example 13 was coated on the coating thereof with the liquid A by means of a roll coater, followed by drying at 110° C. for 15 minutes and then heating at 200° C. for 30 minutes.

EXAMPLE 17

Example 12 was repeated except that after the completion of the drying step, the platen glass dried was irradiated with light from a high pressure mercury-vapor lamp, 210 mw/cm$^2$ and 2 kw, for 3 minutes.

EXAMPLE 18

Example 13 was repeated except that the platen glass was coated on the surface with the liquid A by means of a roll coater and then dried, followed by irradiation with light from a high pressure mercury-vapor lamp, 210 mw/cm² and 2 Kw, for 3 minutes.

The coated substrates obtained in the foregoing examples were evaluated with respect to the following.

(1) Transparency: A light transmission (Tt) at a wavelength of 550 nm and a haze (H) were measured by means of a haze computer (manufactured by Suga Shikenki K.K.)

(2) Surface resistance (Rs): The surface resistance was measured at a measuring voltage of 500 V by means of Hiresta or Loresta (measuring devices manufactured by Mitsubishi Petrochemical Co., Ltd.)

The coated substrates obtained in Examples 1-11 were also evaluated with respect to (3)-(8) mentioned below.

(3) Resolving power: As shown in FIG. 3, a bar chart 4 shown in FIG. 2 was attached to a substrate 3 to the side thereof on which no coating was formed, and the substrate was arranged in a box 6 so that the coated side of the substrate 3 is positioned outside the box 6. The number of bars separated per 1 cm was visually counted at a distance of 30 cm away from the substrate 3, and the number of bars thus can be confirmed was taken as a resolving power of the substrate. In this case, the bar chart 4 used included those increased in number of bars every 5 bar/cm (e.g. 10, 15, 20 and 25 bar/cm and so on).

(4) Glossiness (G): The glossiness (G) at a measuring angle of 60° was measured according to the method for measuring glossiness stipulated in JIS K7105-81. This glossiness is represented by a relative value of the test speciment to the reflectance of the standard substrate.

(5) Adhesion: A part of a piece of commercially available cellophane adhesive tape was applied to the surface of the coating. The remainder of the tape was then maintained vertical to the coating and instantaneously pulled up to visually examine the coating that remain on or peeled off from the coated substrate.

(6) Film strength: The coated substrate was fixed onto a platform scale, an eraser for clerical purpose (a product equal to No. 50-50 eraser sold under the trade name of LION by Fukui & Co. Ltd.) was placed on the coating, and the eraser was reciprocated 150 times under a load of 2 kg. Thereafter, a surface resistance (Rs) and a glossiness (G) of the substrate were measured.

(7) Average roughness (Rz): The surface of the coating was measured for average roughness (Rz) according to the measurement of Rz stipulated in JIS B601-82 by means of Taly Step (measuring device manufactured by Rank Taylor Hobson Co.).

(8) Durability: The speciment of the coated substrate was immersed in the following seven liquids, respectively, and then adhesion of the coating to the substrate was evaluated. The glossiness and surface resistance of the coated surface of the substrate before and after the test were also determined by comparison (1) Immersed for 12 hours at room temperature in 15 wt % of ammonia water.
(2) Immersed for 120 hours at room temperature in 10 wt % aqueous NaCl solution.
(3) Immersed for 30 minutes in boiling water.
(4) Immersed for 120 hours at room temperature in 50 wt % aqueous acetic acid solution.
(5) Immersed for 1 week at room temperature in acetone.
(6) Immersed for 1 week at room temperature in ethanol.
(7) Immersed for 1 week at room temperature in n-propanol.

The coated substrates obtained in Examples 12-18 were further evaluated with respect to the following items (9) and (10) in addition (1) and (2).

(9) Paper feed test: A platen glass was incorporated into a copy machine with ADF, and A-4 copying papers were continuously fed to ADF to count the number of copying papers which fed before clogging of the copying paper took place.

(10) Stain test: The number of A-4 copying papers continuously fed to ADF at a gray scale was counted before stains appeared on the copying paper. Further, a light transmission (Tt) at a wavelength of 550 nm of the platen glass was measured at the time when the stains appeared.

However, Tt was measured after the completion of the paper feed test (9) when no stains appeared.

For comparison, the platen glass, prior to forming a coating thereon, used in Example 12 and ITO glass having formed ITO coating on the surface by sputtering method were individually incorporated in a copy machine, and there were conducted Tt, H, Rs paper feed test and stain test therefor.

The results obtained are shown in Table 1, 2 and 3, respectively.

TABLE 1

| Example | Tt % | H % | Resolving power bar/cm | G % | Rs Ω/□ | Adhesion | Film strength Rs Ω/□ | G % | Rz μm |
|---|---|---|---|---|---|---|---|---|---|
| 1 | 91.5 | 0.8 | 70 | 152 | $2 \times 10^6$ | o | $4 \times 10^6$ | 156 | 0.02 |
| 2 | 92.2 | 0.3 | 70 | 156 | $1 \times 10^6$ | o | $2 \times 10^6$ | 158 | 0.02 |
| 3 | 91.0 | 1.2 | 75 | 142 | $2 \times 10^6$ | o | $2 \times 10^6$ | 144 | 0.01 |
| 4 | 91.2 | 1.0 | 75 | 146 | $2 \times 10^6$ | o | $2 \times 10^6$ | 146 | 0.01 |
| 5 | 91.9 | 4.0 | 65 | 65 | $8 \times 10^8$ | o | $1 \times 10^9$ | 70 | 0.98 |
| 6 | 92.1 | 3.4 | 65 | 67 | $5 \times 10^8$ | o | $7 \times 10^9$ | 70 | 0.95 |
| 7 | 92.0 | 5.0 | 70 | 59 | $8 \times 10^8$ | o | $8 \times 10^8$ | 62 | 1.10 |
| 8 | 90.2 | 4.5 | 70 | 61 | $8 \times 10^8$ | o | $8 \times 10^8$ | 62 | 1.03 |
| 9 | 92.4 | 3.8 | 70 | 63 | $1 \times 10^6$ | o | $1 \times 10^6$ | 66 | 1.00 |
| 10 | 93.8 | 3.3 | 70 | 65 | $1 \times 10^6$ | o | $1 \times 10^6$ | 66 | 0.95 |
| 11 | 91.5 | 0.8 | 70 | 153 | $1 \times 10^6$ | o | $3 \times 10^6$ | 160 | 0.02 |

TABLE 2

| Example | Ammonia water Rs Ω/□ | Ammonia water G % | NaCl Rs Ω/□ | NaCl G % | Boiling water Rs Ω/□ | Boiling water G % | Acetic acid Rs Ω/□ | Acetic acid G % | Acetone Rs Ω/□ | Acetone G % | EtOH Rs Ω/□ | EtOH G % | n-PrOH Rs Ω/□ | n-PrOH G % |
|---|---|---|---|---|---|---|---|---|---|---|---|---|---|---|
| 1 | $3 \times 10^6$ | 155 | $2 \times 10^6$ | 152 | $3 \times 10^6$ | 153 | $2 \times 10^6$ | 153 | $2 \times 10^6$ | 152 | $2 \times 10^6$ | 152 | $2 \times 10^6$ | 152 |
| 2 | $1 \times 10^6$ | 157 | $1 \times 10^6$ | 156 | $1 \times 10^6$ | 155 | $1 \times 10^6$ | 156 | $1 \times 10^6$ | 158 | $1 \times 10^6$ | 158 | $1 \times 10^6$ | 158 |
| 3 | $2 \times 10^6$ | 144 | $2 \times 10^6$ | 142 | $2 \times 10^6$ | 142 | $2 \times 10^6$ | 142 | $2 \times 10^6$ | 142 | $2 \times 10^6$ | 142 | $2 \times 10^6$ | 142 |
| 4 | $2 \times 10^6$ | 147 | $2 \times 10^6$ | 146 | $2 \times 10^6$ | 146 | $2 \times 10^6$ | 146 | $2 \times 10^6$ | 146 | $2 \times 10^6$ | 146 | $2 \times 10^6$ | 146 |
| 5 | $1 \times 10^9$ | 69 | $9 \times 10^9$ | 65 | $1 \times 10^9$ | 66 | $9 \times 10^7$ | 65 | $8 \times 10^8$ | 65 | $8 \times 10^8$ | 65 | $8 \times 10^8$ | 65 |
| 6 | $6 \times 10^9$ | 69 | $5 \times 10^8$ | 67 | $6 \times 10^8$ | 69 | $5 \times 10^8$ | 67 | $5 \times 10^8$ | 67 | $5 \times 10^8$ | 67 | $5 \times 10^8$ | 67 |
| 7 | $8 \times 10^8$ | 62 | $8 \times 10^8$ | 59 | $8 \times 10^8$ | 60 | $8 \times 10^8$ | 59 | $8 \times 10^8$ | 59 | $8 \times 10^8$ | 59 | $8 \times 10^8$ | 59 |
| 8 | $8 \times 10^8$ | 61 | $8 \times 10^8$ | 61 | $8 \times 10^8$ | 61 | $8 \times 10^8$ | 61 | $8 \times 10^8$ | 61 | $8 \times 10^8$ | 61 | $8 \times 10^8$ | 61 |
| 9 | $1 \times 10^6$ | 65 | $1 \times 10^6$ | 65 | $1 \times 10^6$ | 63 | $1 \times 10^6$ | 65 | $1 \times 10^6$ | 65 | $1 \times 10^6$ | 63 | $1 \times 10^6$ | 63 |
| 10 | $1 \times 10^6$ | 65 | $1 \times 10^6$ | 65 | $1 \times 10^6$ | 65 | $1 \times 10^6$ | 65 | $1 \times 10^6$ | 65 | $1 \times 10^6$ | 65 | $1 \times 10^6$ | 65 |
| 11 | $3 \times 10^6$ | 153 | $3 \times 10^6$ | 150 | $4 \times 10^6$ | 150 | $1 \times 10^6$ | 153 | $1 \times 10^6$ | 153 | $1 \times 10^6$ | 153 | $1 \times 10^6$ | 153 |

TABLE 3

| | $T_t$ % | H % | Rs Ω/□ | Paper feed test sheet | Stain test stain sheet | Stain test $T_t$ % |
|---|---|---|---|---|---|---|
| Example 12 | 90.6 | 2.1 | $1 \times 10^6$ | 30000 | >200000 | 90.2 |
| Example 13 | 92.1 | 0.5 | $8 \times 10^6$ | >200000 | >200000 | 90.5 |
| Example 14 | 89.5 | 0.8 | $9 \times 10^6$ | >200000 | >200000 | 88.9 |
| Example 15 | 91.0 | 0.3 | $8 \times 10^6$ | >200000 | >200000 | 90.1 |
| Example 16 | 92.2 | 0.2 | $1 \times 10^8$ | >200000 | >200000 | 90.3 |
| Example 17 | 91.0 | 1.8 | $1 \times 10^6$ | 100000 | >200000 | 90.6 |
| Example 18 | 92.3 | 0.5 | $8 \times 10^6$ | >200000 | >200000 | 91.9 |
| Platen glass | 90.8 | 1.0 | $1 \times 10^{13}$ | 100 | >200000 | 90.8 |
| ITO glass | 91.0 | 0.5 | $1 \times 10^3$ | >200000 | 60000 | 85.5 |

We claim:

1. A transparent conductive ceramic-coated substrate having formed on the surface a transparent conductive ceramic coating by using a coating liquid for forming a transparent conductive ceramic coating, said coating liquid being prepared by homogeneously dissolving or dispersing dialkoxy-bisacetylacetonato zirconium, a partial hydrolysate of silicon alkoxide and a conductive substance in a mixed solvent comprising water and an organic solvent, and said substrate having a surface resistance of $10^3$–$10^{11}$ Ω□, a total light transmission of at least 85% and a haze of less than 10%.

2. A transparent conductive ceramic-coated substrate having formed on the surface a transparent conductive ceramic coating by using a coating liquid for forming a transparent conductive ceramic coating, said coating liquid being prepared by homogeneously dissolving or dispersing dialkoxy-bisacetylacetonato zirconium, a partial hydrolysate of silicon alkoxide and a conductive substance in a mixed solvent comprising water and an organic solvent, and said substrate having a surface resistance of $10^3$–$10^{11}$ Ω□, and a glossiness of 30–100%.

3. A display having been equipped, as a face-plate, a transparent conductive ceramic coated substrate having formed on the surface a transparent conductive ceramic coating by using a coating liquid for forming a transparent conductive coating, said coating liquid being prepared by homogeneously dissolving or dispersing dialkoxy-bisacetylacetonato zirconium, a partial hydrolysate of silicon alkoxide and a conductive substance in a mixed solvent comprising water and an organic solvent, and said substrate having a surface resistance of $10^3$–$10^{11}$ Ω□, a total light transmission of at least 85% a haze of less than 10% and a resolving power of at least 50 bar/cm.

4. A display having been equipped, as a face-plate, a transparent conductive ceramic-coated substrate having formed on the surface a transparent conductive ceramic coating by using a coating liquid for forming a transparent conductive ceramic coating, said coating liquid being prepared by homogeneously dissolving or dispersing dialkoxy-bisacetylacetonato zirconium, a partial hydrolysate of silicon alkoxide and a conductive substance in a mixed solvent comprising water and an organic solvent, and said substrate having a surface resistance of $10^3$–$10^{11}$ Ω□, a glossiness of 30–100% and a resolving power of at least 50 bar/cm.

5. A copy machine having been equipped, as a platen glass, a transparent conductive ceramic-coated substrate having formed on the surface by using a coating liquid for forming a transparent conductive ceramic coating, said coating liquid being prepared by homogeneously dissolving or dispensing dialkoxy-bisacetylacetonato zirconium, a partial hydrolysate of silicon alkoxide and a conductive substance, and said substrate having a surface resistance of $10^3$–$11^{11}$ Ω□, a total light transmission of at least 85% and a haze of less than 10%.

6. A process for preparing a transparent conductive ceramic-coated substrate, which comprises coating on a substrate a coating liquid for forming a transparent conductive ceramic coating, followed by drying and/or heating, said coating liquid being prepared by homogeneously dissolving or dispersing dialkoxy-bisacetylacetonato zirconium, a partial hydrolysate of silicon alkoxide and a conductive substance in a mixed solvent comprising water and an organic solvent.

7. A process for preparing a transparent conductive ceramic-coated substrate, which comprises coating a coating liquid for forming a transparent conductive ceramic coating on a substrate preheated to 40°–90° C. and kept at that temperature, followed by drying and/or heating, said coating liquid being prepared by homogeneously dissolving or dispersing dialkoxy-bisacetylacetonato zirconium, a partial hydrolysate of silicon alkoxide and a conductive substance in a mixed solvent comprising water and an organic solvent.

8. The process for preparing a transparent conductive ceramic-coated substrate as claimed in claim 6 or 7, wherein the substrate is irradiated with an electromagnetic wave having a wavelength shorter than that of visible light after and/or during at least one of the steps (1) of coating the coating liquid, (2) of drying the coating and (3) of heating the coating.

9. A process for preparing a transparent conductive ceramic-coated substrate, which comprises coating a coating liquid for forming a transparent protective coating on the substrate obtained by the process for preparing the substrate as claimed in claim 6 or 7, followed by drying and/or heating.

10. A process for preparing a transparent conductive ceramic-coated substrate, which comprises preheating to 40°-90° C. and keeping at that temperature the substrate obtained by the process for preparing the substance as claimed in claim 6 or 7, and coating a coating liquid for forming a transparent protective coating on said substrate, followed by drying and/or heating.

11. The process for preparing a transparent conductive ceramic-coated substrate as claimed in claim 9, wherein the substrate is irradiated with an electromagnetic wave having a wavelength shorter than that of visible light after and/or during at least one of the steps (1) of coating the coating liquid for forming a transparent protective coating, (2) of drying the protective coating and (3) of heating the protective coating.

12. A process for preparing a transparent conductive ceramic-coated substrate, which comprises coating a coating liquid for forming a transparent protective coating on the substrate obtained by the process for preparing the substance as claimed in claim 8, followed by drying and/or heating.

13. A process for preparing a transparent conductive ceramic-coated substrate, which comprises preheating to 40°-90° C. and keeping at that temperature the substrate obtained by the process for preparing the substrate as claimed in claim 8, and coating a coating liquid for forming a transparent protective coating on said substrate, followed by drying and/or heating.

14. The process for preparing a transparent conductive ceramic-coated substrate as claimed in claim 10, wherein the substrate is irradiated with an electromagnetic wave having a wavelength shorter than that of visible light after and/or during at least one of the steps (1) of coating the coating liquid for forming a transparent protective coating, (2) of drying the protective coating and (3) of heating the protective coating.

* * * * *